(12) United States Patent
Geddes et al.

(10) Patent No.: US 7,002,471 B2
(45) Date of Patent: Feb. 21, 2006

(54) SYSTEMS AND METHODS FOR INSTALLATION AND MAINTENANCE OF PROXIMITY SENSORS

(75) Inventors: Alexander C. Geddes, Uddingston (GB); Knuk E. Jermer, Sonderborg (DK)

(73) Assignee: Honeywell International Inc., Morristown, NJ (US)

( * ) Notice: Subject to any disclaimer, the term of this patent is extended or adjusted under 35 U.S.C. 154(b) by 158 days.

(21) Appl. No.: 10/758,545

(22) Filed: Jan. 14, 2004

(65) Prior Publication Data

US 2005/0151719 A1 Jul. 14, 2005

(51) Int. Cl.
*G08B 1/08* (2006.01)
(52) U.S. Cl. ............... 340/539.23; 340/686.6
(58) Field of Classification Search .......... 324/601, 324/207.26, 202; 347/116; 600/300; 702/158; 340/687, 686.6, 686.2, 686.1, 539.24, 539.11, 340/539.1, 539.23
See application file for complete search history.

(56) References Cited

U.S. PATENT DOCUMENTS

| | | | | |
|---|---|---|---|---|
| 4,827,248 A | * | 5/1989 | Crudden et al. ......... 340/686.6 |
| 5,410,488 A | * | 4/1995 | Andersen, III ............ 702/158 |
| 5,598,572 A | | 1/1997 | Tanikoshi et al. ........... 395/800 |
| 5,648,719 A | * | 7/1997 | Christensen et al. ... 324/207.26 |
| 5,698,975 A | * | 12/1997 | Kayserman ............ 324/207.15 |
| 6,043,774 A | | 3/2000 | Singh et al. ................ 342/127 |
| 6,396,477 B1 | | 5/2002 | Hinckley et al. ........... 345/163 |
| 6,456,275 B1 | | 9/2002 | Hinckley et al. ........... 345/156 |
| 6,507,189 B1 | | 1/2003 | Woolsey et al. ....... 324/207.26 |
| 6,628,962 B1 | | 9/2003 | Katsura ...................... 455/556 |
| 6,633,158 B1 | | 10/2003 | Shen et al. ............ 324/207.26 |
| 6,641,533 B1 | | 11/2003 | Causey, III et al. ........ 600/300 |
| 6,644,849 B1 | | 11/2003 | Conner ...................... 374/141 |
| 6,670,807 B1 | | 12/2003 | Cox ...................... 324/207.26 |

OTHER PUBLICATIONS

Honeywell Sensing and Control—Sensors and Switches, pp. 1-4, Jan. 14, 2004 http://www.aerospace-technology.com.
PCT-Notification of Transmittal of The International Search Report and The Written Opinion of the International Searching Authority, or the Declaration, Date of Mailing Aug. 22, 2005.

* cited by examiner

*Primary Examiner*—Toan N. Pham
(74) *Attorney, Agent, or Firm*—Kris T. Fredrick; Kermit D. Lopez; Luis M. Ortiz

(57) ABSTRACT

Methods and systems for installing and monitoring a proximity sensor are disclosed. A target can be detected utilizing a sensor located proximate to the target. Data can be then automatically generated by the sensor, wherein the data comprises information indicative of the relative position of the target and the sensor. Thereafter, the data can be transmitted from the sensor to a mobile device (e.g., a PDA, laptop computer, etc) having a processor for processing the data and a graphical user interface, wherein the data can be displayed and manipulated by a user of the mobile device in order to accurately position the sensor and target for installation and maintenance thereof.

19 Claims, 8 Drawing Sheets

DISPLAY ALL CHANNELS

| | ACTIVE | | | STATUS | |
|---|---|---|---|---|---|
| 602 → | ☑ | CHANNEL 1 | "TYPE" | "GAP mm" | ● ← 618 |
| 604 → | ☑ | CHANNEL 2 | "" | "" | ● ← 620 |
| 606 → | ☑ | CHANNEL 3 | "" | "" | ● ← 622 |
| 608 → | ☑ | CHANNEL 4 | "" | "" | ● ← 624 |
| 610 → | ☐ | CHANNEL 5 | "" | "" | ● ← 626 |
| 612 → | ☐ | CHANNEL 6 | "" | "" | ● ← 628 |
| 614 → | ☐ | CHANNEL 7 | "TYPE" | "GAP mm" | ● ← 630 |
| 616 → | ☐ | DISPLAY ACTIVE CHANNELS ONLY | | | |

600    632 → [ EXIT ]    [ DEBUG ] ← 634

*Fig. 6*

RIGGING SCREEN 1

SENSOR TYPE    : [          ] ← 702
SERIAL NO.     : [          ] ← 704
RIGGING GAP    : [          ] ← 706
SENSOR LOCATION: [          ] ← 708
NOTE           : [          ] ← 710

700                [ EXIT ] ← 712

*Fig. 7*

RIGGING SCREEEN 2

- 802 SIM SERIAL NO. :
- 804 CHANNEL NO. :
- 806 LOCATION :
- 808 NOTE :

800

EXIT — 810

*Fig. 8*

RIGGING SCREEN 3

906 — ● ALTER TARGET POSITION

GAP RANGE    904

+ TOL
NOM
- TOL

900        EXIT — 902

*Fig. 9*

SYSTEMS AND METHODS FOR INSTALLATION AND MAINTENANCE OF PROXIMITY SENSORS

TECHNICAL FIELD

Embodiments are generally related to sensors. Embodiments are also related to proximity sensors utilized in industrial, commercial and military applications. Embodiments are additionally related to hand held computing devices.

BACKGROUND OF THE INVENTION

A variety of proximity sensors are utilized in industrial, commercial and military applications. A typical proximity sensor can utilize inductive switches to detect metal objects at different distances. An electromagnetic field generated by the sensor induces eddy currents on the surface of a metal target, which in turn modifies the sensor's oscillator voltage. This change indicates the presence of the target.

Another category of proximity sensors uses light-based technology. A familiar application of light-based sensing is the laser speed detector used by police to determine the speed of a vehicle. These detectors measure how long it takes a pulse to travel from the sensor module to the target and back again to determine distance, and use two such measurements to calculate speed. A further category of proximity sensors is based on RF sensing techniques. By utilizing electromagnetic energy, RF sensing offers versatility, particularly with regard to environmental tolerance. Microwave energy, for example, can easily penetrate dirt, oils, rain, fog, or snow.

One example of an application in which proximity sensors can be utilized is an aircraft system. During the installation of an aircraft proximity sensor system, it may be necessary to accurately position proximity sensor devices and their associated targets. Such devices are inductive in nature, and can be influenced during set up by surrounding metal, which can result in undesirable back-metal effects. Issues can be raised regarding the accuracy of the installation as an offset in the value of the sensor/target gap value present.

Traditionally, the installation process utilizes so-called "feeler gauges" and relies upon the operator "feel" to set the system gaps. Such processes are limited because of uncertainties with respect to the installer or operator who must physically interact with the aircraft in a manner that can potentially generate unwanted errors. During the life of the aircraft it is particularly desirable to monitor the sensor/target gap in order predict when critical sensors will require maintenance should the gap vary from the original set point. A need thus exists for a method and system which would permit a user to effectively and efficiently interact with sensor components and targets for installation and maintenance thereof in a manner which is non-invasive and consistent.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor apparatus and method.

It is also an aspect of the present invention to provide for a proximity sensor for use in industrial, commercial and military applications.

It is yet another aspect of the present invention to provide for hand held computing devices, including mobile devices, such as personal digital assistant (PDA) devices and lap top computers, which can be utilized in association with proximity sensors for installation and maintenance of such sensors and systems in which such sensors are implemented.

The aforementioned aspects of the invention and other objectives and advantages can now be achieved as described herein. Methods and systems for installing and monitoring a proximity sensor are disclosed. A target can be detected utilizing a sensor located proximate to the target. Data can be then automatically generated by the sensor, wherein the data comprises information indicative of the relative position of the target and the sensor. Thereafter, the data can be transmitted from the sensor to a mobile device (e.g., a PDA, laptop computer, etc) having a processor for processing the data and a graphical user interface, wherein the data can be displayed and manipulated by a user of the mobile device in order to accurately position the sensor and target for installation and maintenance thereof.

The data, including updated data thereof, can be stored in a database accessible by the mobile device, in response to processing the data by the processor associated with the mobile device. Thereafter, such data can be retrieved from the database via the mobile device for fault detection and maintenance of the target. The database can be associated with a network through which the mobile device communicates in order to access data stored within the database. Such a network can be, for example, a wireless network (e.g., a cellular network) and/or a computer network (e.g., Internet, World Wide Web). The target itself can be a component of a moving mechanical system, such as that present in aircraft systems. The sensor and target can be installed, for example, on moving mechanical parts and systems, such as door mechanisms and landing gear to determine the position of key components of the system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 6 illustrates a pictorial diagram of a channel display screen, which can be displayed on a graphical user interface of a mobile device, in accordance with an embodiment of the present invention;

FIG. 7 illustrates a pictorial diagram of a first rigging screen, which can be displayed on a graphical user interface of a mobile device, in accordance with an embodiment of the present invention;

FIG. 8 illustrates a pictorial diagram of a second rigging screen, which can be displayed on a graphical user interface of a mobile device, in accordance with an embodiment of the present invention;

FIG. 9 illustrates a pictorial diagram of a third rigging screen, which can be displayed on a graphical user interface of a mobile device, in accordance with an embodiment of the present invention;

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
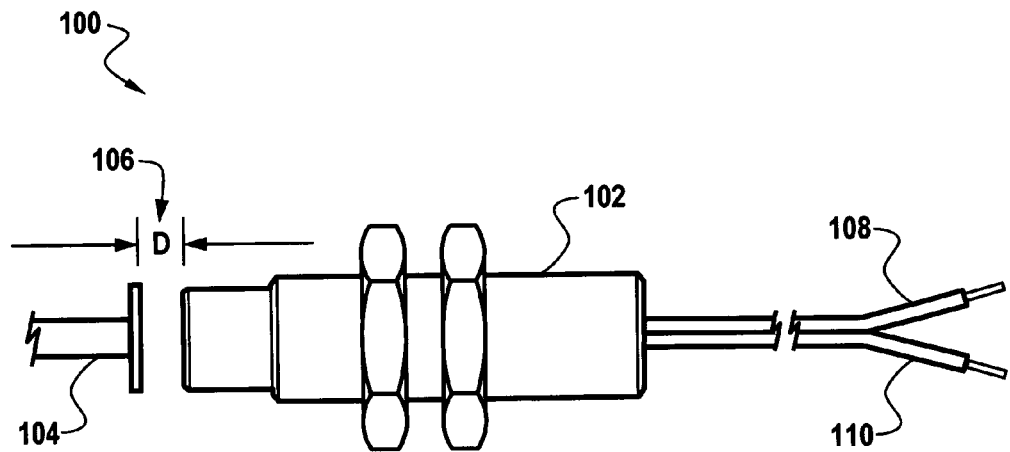
FIG. 1 illustrates a pictorial diagram of a sensor and a target, in accordance with an embodiment of the present invention.

FIG. 1 illustrates a pictorial diagram of a system 100 composed of a sensor 102 and a target 104, in accordance with an embodiment of the present invention. Installation. The sensor 203 and target 104 can be installed on or in association with a moving mechanical system, such as an aircraft, including door mechanisms and aircraft landing gear, in order to determine the position of key components of the system. Note that although embodiments reference aircraft systems, it can be appreciated that such embodiments can be deployed within other industrial and commercial applications, including electro-mechanical systems such as assembly lines, manufacturing facilities, automobiles, aerospace vehicles, and the like. Aircraft systems are referred to herein for illustrative purposes only as one possible example of an electro-mechanical system in which embodiments can be deployed. Aircraft systems are therefore not considered a limiting feature of the present invention.

As indicated in FIG. 1, the target 104 can be located a distance D from sensor 102. A gap 106 is formed between sensor 102 and target 104. Sensor 102 additionally includes leads 108 and 110, which can be configured for wireless transmission of data from sensor 102 to a hand held computing or mobile device (not shown in FIG. 1). Examples of mobile or hand held computing devices, which can be implemented in accordance with embodiments of the present invention, include mobile devices such as laptop computers, PDA (Personal Digital Assistant) devices, cellular telephones, and the like.

Figure 2:
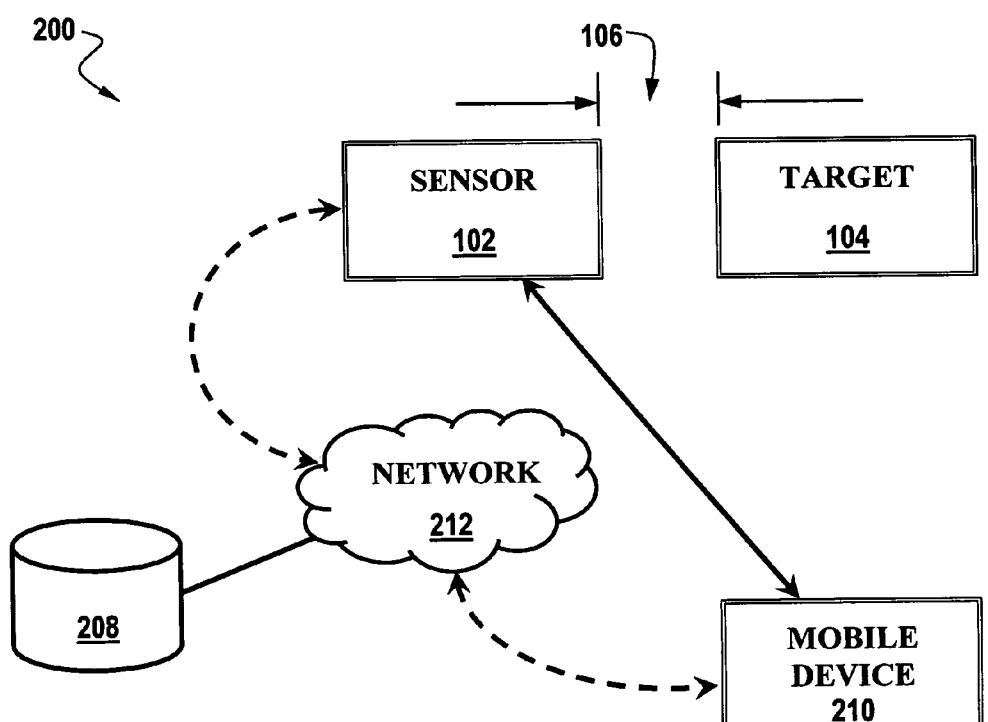
FIG. 2 illustrates a block diagram of a system in which an embodiment of the present invention can be implemented.

FIG. 2 illustrates a block diagram of a system 200 in which an embodiment of the present invention can be implemented. Note that in FIGS. 1 and 2, identical or similar parts or components are indicated by identical reference numerals. FIG. 2 depicts a mobile device 210, which can communicate with sensor 102. Mobile device 210 depicted in FIG. 2 can be configured as one of a variety of hand held computing devices, such as a PDA or a laptop computer. Mobile device 210 can communicate directly with sensor 102 via wireless communications means such as infrared (IR) data exchange transmissions. Alternatively, mobile device 210 may communicate with sensor 102 through a network 212, which can be, for example, a wireless network such as a cellular network or a local wireless network, such as, for example, a Bluetooth or 802.11 enabled wireless network.

Network 212 can be implemented as any number of computer and/or wireless networks. For example, network 212 may configured as an open global network or a secure global network. Network 212 may also be implemented as a local network such as an "Intranet" network. Additionally, network 212 can simply be a computer network such as the well-known "World Wide Web". Note that the term "World Wide Web" is well-known in the computer arts and refers generally to the total set of interlinked hypertext documents residing on HTTP servers throughout the world. On the "World Wide Web" documents, files, menus, indices and the like are represented to a user as a hypertext objects in HTML format. Hypertext links refer to other documents by their URLs. These can refer to local or remote resources accessible via FTP, Gopher, Telnet or news, as well as those available via the http protocol used to transfer hypertext documents. A client program, generally known as a "browser" runs on a user's computer and provides basic navigation operations, such as following a link or sending a query to a server. It can be appreciated that network 212 can be implemented as a global network, a local network or a combination thereof. Local networks include so-called "Intranet" networks which can be deployed exclusively to a particular company or organization.

Mobile device 210 can operate as a rigging tool for accurately positioning sensor 102 with respect to target 104 for feedback and maintenance thereof. Mobile device 210 (i.e., a hand held rigging tool) can provide both graphical and numerical feedback to a user (i.e., an installer) of the relative position of sensor 102 and target 104. Using mobile device 210, an installer can record information such as the sensor type, serial number, and overall position of sensor 102 within an installed configuration, such as that of an aircraft. All information can then be stored within a central database 208, which can be accessible to aircraft maintenance personnel world wide through network 212 (i.e., in the case where network 212 comprises the well-known World Wide Web).

Note that mobile 210 may communicate with network 212 via Wireless Application Protocol (WAP), a well-known protocol for enabling communications between wireless mobile devices and computer networks such as the well-known World Wide Web. Other protocols or wireless communications techniques can also be implemented in accordance with alternative embodiments of the present invention.

As the sensor-to-target distance D varies due to wear or damage in mechanics of the system (e.g., an aircraft), trend monitoring can be utilized to predict maintenance schedules or indicate that damage has occurred within the system. In this case the rigging tool (i.e., mobile device 210) acts as a data collection device when connected to the sensors (e.g., sensor 102) and the aircraft system. Mobile device 210 can be synchronized with sensor 102 to retrieve updated data thereof. Mobile device 210 can then compare the new or updated data with the database record (i.e., database 212) and the next course of action determined.

Figure 3:
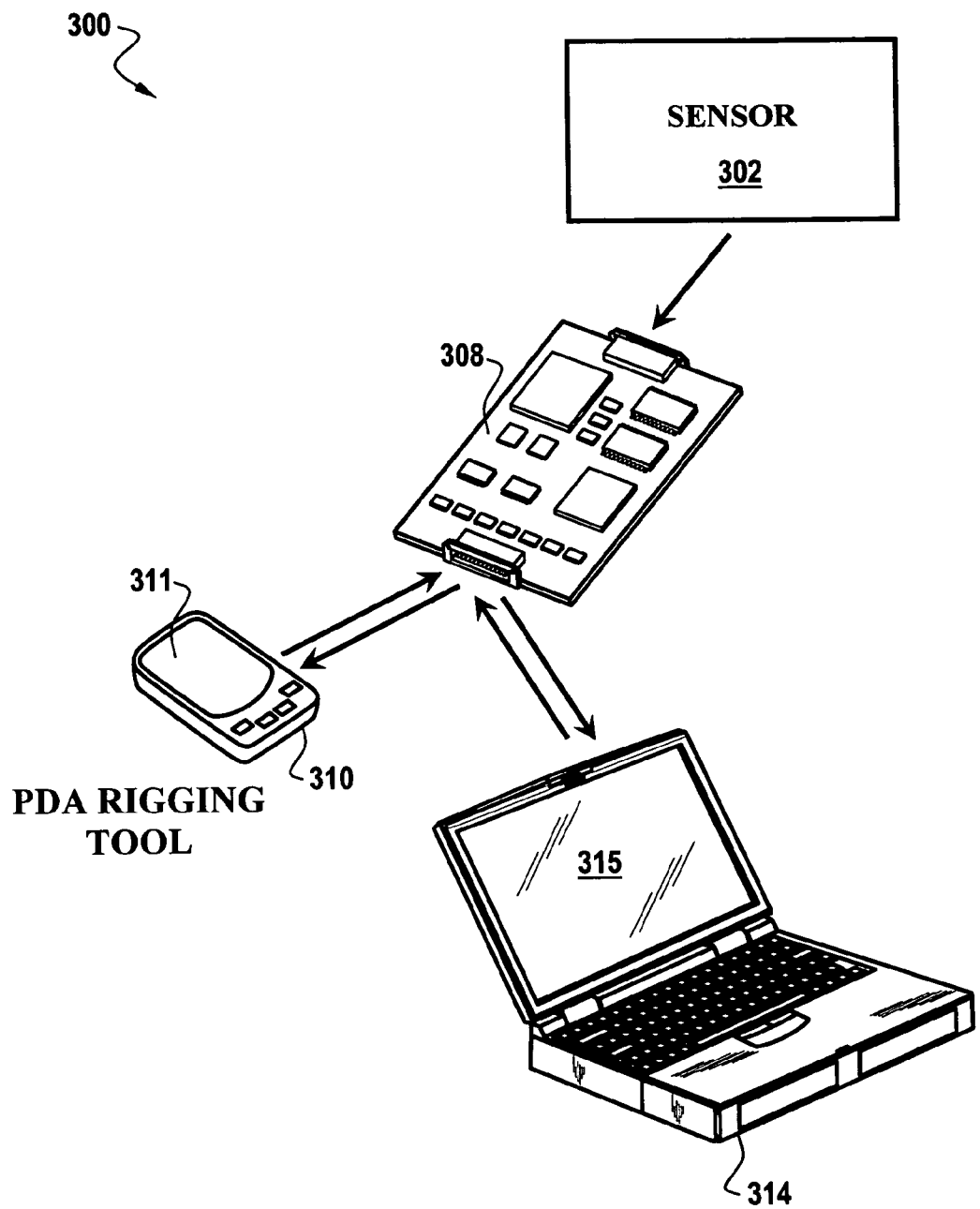
FIG. 3 illustrates a block diagram of a system in which in an alternative embodiment of the present invention can be implemented.

FIG. 3 illustrates a block diagram of a system 300 in which in an alternative embodiment of the present invention can be implemented. A mobile device 310 (i.e., a PDA rigging tool) can communicate with a sensor interface module 308, which receives data from a sensor 302. Note that in FIG. 3, mobile device 310 is depicted as a PDA. It can be appreciated that a PDA is not a limiting feature of the present invention but merely represents one type of hand held computing device that can be adapted for use with the methods and systems disclosed herein.

Sensor data collected from sensor 302 can be converted by the sensor interface module 308 to serial data and displayed on a display screen 311 of the mobile device 310 and/or as analog data on a display screen 315 of another mobile device 314 (i.e., a laptop computer). Note that sensor 302 is analogous to sensor 102 of FIGS. 1 and 2. The sensor interface module (SIM) 308 can communicate with mobile device 310 and/or 314 to instruct mobile device 310 and/or 314 to process sensor data received by from the sensor 302 and display such data on a graphical user interface in a format that permits a user of the mobile device 310 and/or 314 to accurately manipulate the data in order to position the sensor 302 and a target thereof for proper installation and maintenance.

Figure 4:
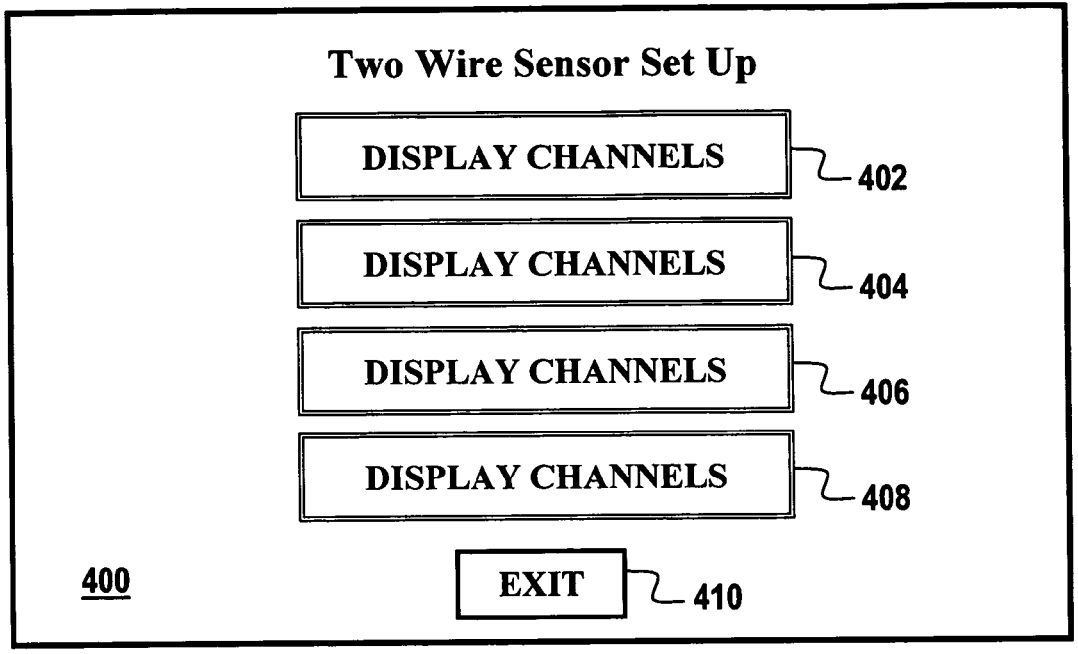
FIG. 4 illustrates a pictorial diagram of a front screen, which can be displayed on a graphical user interface of a mobile device, in accordance with an embodiment of the present invention.

Mobile devices such mobile device 210 of FIG. 2 and mobile devices 310 and 314 of FIG. 4 can provide a graphical user interface for display of sensor data collected from sensors, such as sensor 102 and/or sensor 302. A graphical user interface (GUI) is a type of environment that can represent programs, files, options, and the like through the display of interactive icons, menus, dialog boxes, and so forth on a display screen, such as display screens 311 and/or 315. A user (e.g., an installer) can select and activate such features by pointing and clicking with pointing device in the case of a laptop computer or a stylus or other input mechanism in the case of a PDA. A graphical user interface thus provides standard software routines (software modules) to handle the features and implement a user's instructions through interactive input and feedback via the graphical user interface.

The term "module" as utilized herein has two meanings. First, a "module" can refer to a physical component of a hardware system. Such a module can be implemented as a self-contained component that can provide a complete function to a system and can be interchanged with other modules that provide similar functions. Mobile device 310, for example, can be configured to include an expansion slot to which module 308 can be connected.

Second, a "module" can also refer to a collection of routines and data structures that perform a particular task, a collection of tasks, and/or implements a particular abstract data type. Modules of this type can also be referred to as software modules and usually include a interface, which lists the constants, data types, variables, and routines that can be accessed by other modules or routines, and an implementation, which is private and only accessible to the module, and which contains the source code that actually implements the routines in the module. Thus, a module can comprise an individual module or a group of modules (routines, subroutines, etc.) to form a single module.

FIG. 4 illustrates a pictorial diagram of a front screen 4010, which can be displayed on a graphical user interface of a mobile device, such as mobile devices 210, 310 and 314, in accordance with an embodiment of the present invention. Front screen 410 includes interactive graphical input buttons, including an input button 402 for activating display channels, an input button 404 for sensor installation routines, an input button 406 for checking the installation station of a sensor (e.g., sensor 302, 302), and an input button 408 for activating enhanced debugging routines. By activating input button 402 labeled "Display Channels," for example, a user can access a display screen for displaying channels, such as that depicted in FIG. 6 herein.

Input button 402 for "Display Channels" assumes a connection to an associated SIM, rather than installation tool. By "clicking" input button 402, the graphical user interface "jumps" to another display screen which permits a user to enter SIM data. An input button 410 can be utilized to exit front screen 400. Input button 404 for "Install Sensor" can be utilized in conjunction with an installation tool positioned at the sensor location. When a user "clicks" input button 404, the graphical user interface "jumps" to a display screen which permits a user to enter SIM data. Input button 405 for "Check Installation" permits a user to debug installation data, and check for cable faults, defective or wrong sensors, and so forth, followed by a "jump" to a graphical user interface "screen" for entering SIM data. Input button 408 for "Enhanced Debug" can be utilized to provide a tool for the examination of Flash, DSP, and other similar electronic components.

Figure 5:
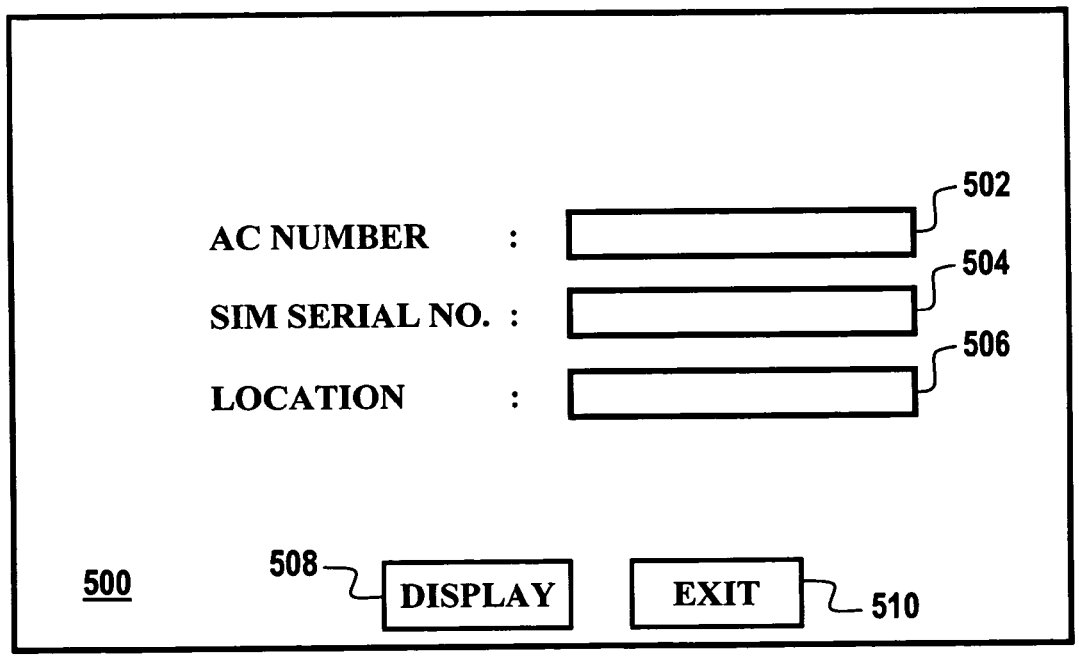
FIG. 5 illustrates a pictorial diagram of a SIM data screen, which can be displayed on a graphical user interface of a mobile device, in accordance with an embodiment of the present invention.

FIG. 5 illustrates a pictorial diagram of an SIM (sensor interface module) data screen 500, which can be displayed on a graphical user interface of a mobile device, such as mobile devices 210, 310 and 314, in accordance with an embodiment of the present invention. SIM data screen 500 includes fields 502, 504, and 506 to which data respectively related to A/C number, SIM serial number and location information can be input by a user. Additionally, input button 508 can be provided, which permits a user to activate a display, while input button 510 provides an exit function. A user can therefore enter an aircraft identification number, an SIM serial number, and/or location information associated with the sensor via data screen 500. The entered data can then be utilized to examine the database for installation data for a comparison with the data being returned by the connected SIM card. The data base can also be checked against connected data and thereafter displayed for the user.

FIG. 6 illustrates a pictorial diagram of a channel display screen 600, which can be displayed on a graphical user interface of a mobile device, such as mobile devices 210, 310 and 314, in accordance with an embodiment of the present invention. Channel display screen 600 provides a plurality of graphical input buttons 602–614, which are respectively associated with channels 1–7. A graphical input button 616 can be "checked" to display active channels only. A plurality of status indicators 618–630 are also provided via channel display screen 600, which are respectively associated with channels 1–7 and graphical input buttons 602–614. An input button 632 provides an exit function and an input button 624 provides a debugging function.

Channel display screen 600 can be utilized when the mobile device is connected to an SIM card and located, for example, in an avionics bay of an aircraft facility to indicate whether the aircraft system is functioning in a satisfactory manner. The graphically display box or input buttons 616 can be checked to select active channels only. The graphically displayed boxes or input buttons 602–614 can be utilized to display only those channels that the user desires to view. In the example depicted in FIG. 6, only channels 1–4 are indicated are indicated as checked, but in other embodiments or implementations, other channels or variations thereof may be checked or activated via channel display screen 600. The channels status indicators 618–630 can provide fault indication. Note that each channel may also be provided with a channel number type associated with the sensor and a gap value associated with the gap between the sensor and the target, such as, for example, the gap 106 located between sensor 102 and target 104 of FIGS. 1 and 2.

FIG. 7 illustrates a pictorial diagram of a first rigging screen 700, which can be displayed on a graphical user interface of a mobile device such as mobile devices 210, 310 and 314, in accordance with an embodiment of the present invention. First rigging screen 700 provides a plurality of input fields 702–710, which respectively permit a user or operator to enter data concerning the sensor type, serial number, rigging gap, sensor location and miscellaneous notes. A record can then be created with such information, which is automatically time-stamped and recorded in a database (e.g., database 208 of FIG. 2), thereby providing a record of the initial rigging. By activating input field 712 such a record can therefore be created. The graphical user interface then progresses to second rigging screen 800, which is depicted in FIG. 8.

FIG. 8 illustrates a pictorial diagram of the second rigging screen 800, which can be displayed on a graphical user interface of a mobile device such as mobile devices 210, 310 and 314, in accordance with an embodiment of the present invention. Second rigging screen 800 can be utilized to record which SIM and channel number are connected to a particular sensor. Upon exit from second rigging screen 800, the database record (e.g., database 208 of FIG. 2) is updated for use in checking the installation process, including graphical user interface display screens thereof. SIM serial number data can be entered via input field 802, while the channel number can be entered utilizing field 804. Location information can be provided by a user utilizing input field 806. Miscellaneous notes can be entered via input field 808. An input button 810 can be activated by a user to exit second rigging screen 800.

FIG. 9 illustrates a pictorial diagram of a third rigging screen 900 such as mobile devices 210, 310 and 314, which can be displayed on a graphical user interface of a mobile device, in accordance with an embodiment of the present invention. Third rigging screen 900 provides a graphical user interface display which can indicate a nominal rigging point and information indicative of sensor tolerance or acceptable limits (TBD). Third rigging screen 900 can further indicate actual sensor position information, and an indicator 906 which flashes to indicate an altered target position until a nominal (e.g., +/– tol) level has been achieved. A user can exit third rigging screen 900 by activating input button 902. Upon exit from third display screen 900, a database record (e.g., database 208 of FIG. 2) can be updated to include the initial rigged sensor value.

Figure 10:
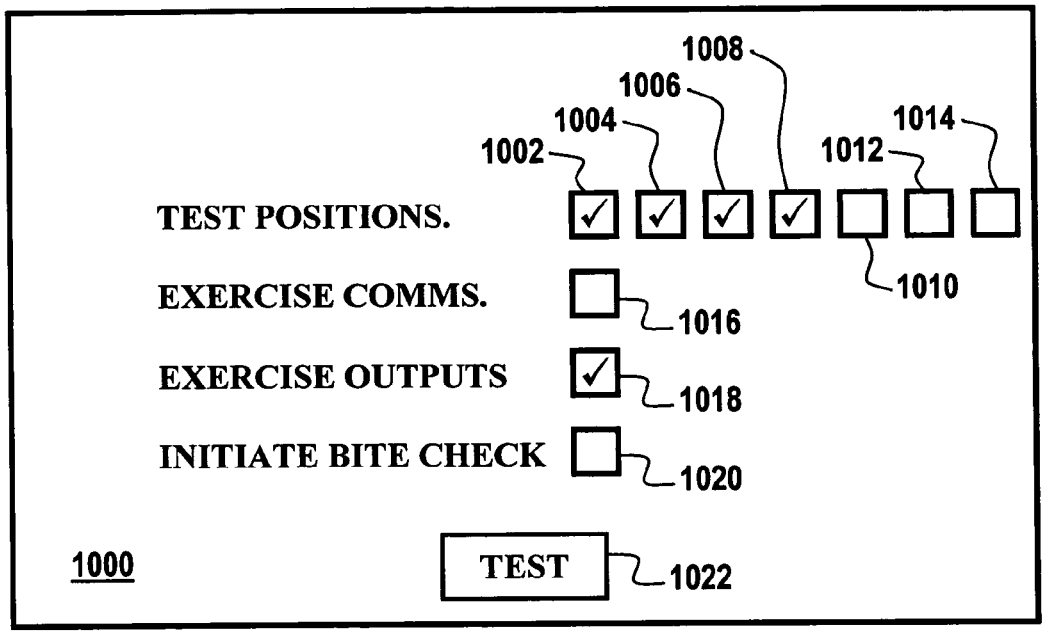
FIG. 10 illustrates a pictorial diagram of a first debug screen, which can be displayed on a graphical user interface of a mobile device, in accordance with an embodiment of the present invention.

FIG. 10 illustrates a pictorial diagram of a first debug screen 1000, which can be displayed on a graphical user interface of a mobile device such as mobile devices 210, 310 and 314, in accordance with an embodiment of the present invention. First debug screen 1000 generally includes a plurality of graphically displayed boxes or input buttons 1002–1014 which are associated with target positions (e.g., positions of target 104 of FIGS. 1–2). First debug screen 1000 also can provide a box or input button 1016 for exercise communications and a box or input button 1018 for exercise outputs. A box or input button 1020 can also be provided on first debug screen 1000 for initiated a bit check or bit test. By activating input button 1022, operations associated with one of the checked boxes 1002–1020 can be initiated.

Figure 11:
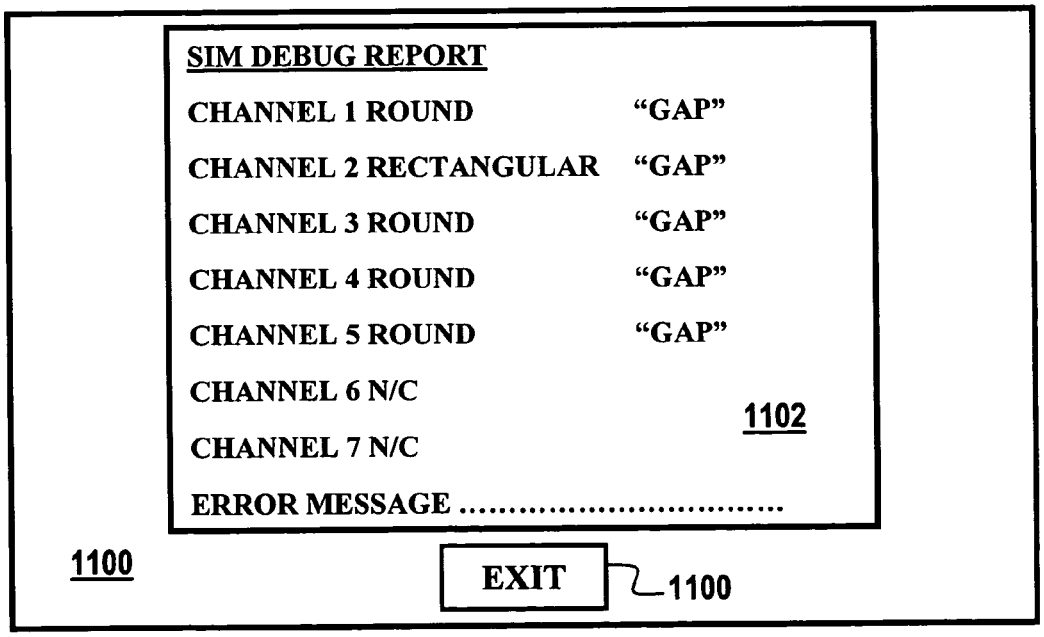
FIG. 11 illustrates a pictorial diagram of a second debug screen, which can be displayed on a graphical user interface of a mobile device, in accordance with an embodiment of the present invention.

FIG. 11 illustrates a pictorial diagram of a second debug screen 1100, which can be displayed on a graphical user interface of a mobile device such as mobile devices 210, 310 and 314, in accordance with an embodiment of the present invention. Second debug screen 1100 can be utilized to compares the database (e.g., database 208 of FIG. 2) with reported sensor reported data, which is indicated in section 1102. For example a cable length >1000 m or ca able resistance K ohms can be indicated via second debug screen 1100. An input button 1100 can be "clicked" by a user to exit second debug screen 1100. Upon exit from second debug screen 1100 via input button 1100, an error log file can be generated.

Figure 12:
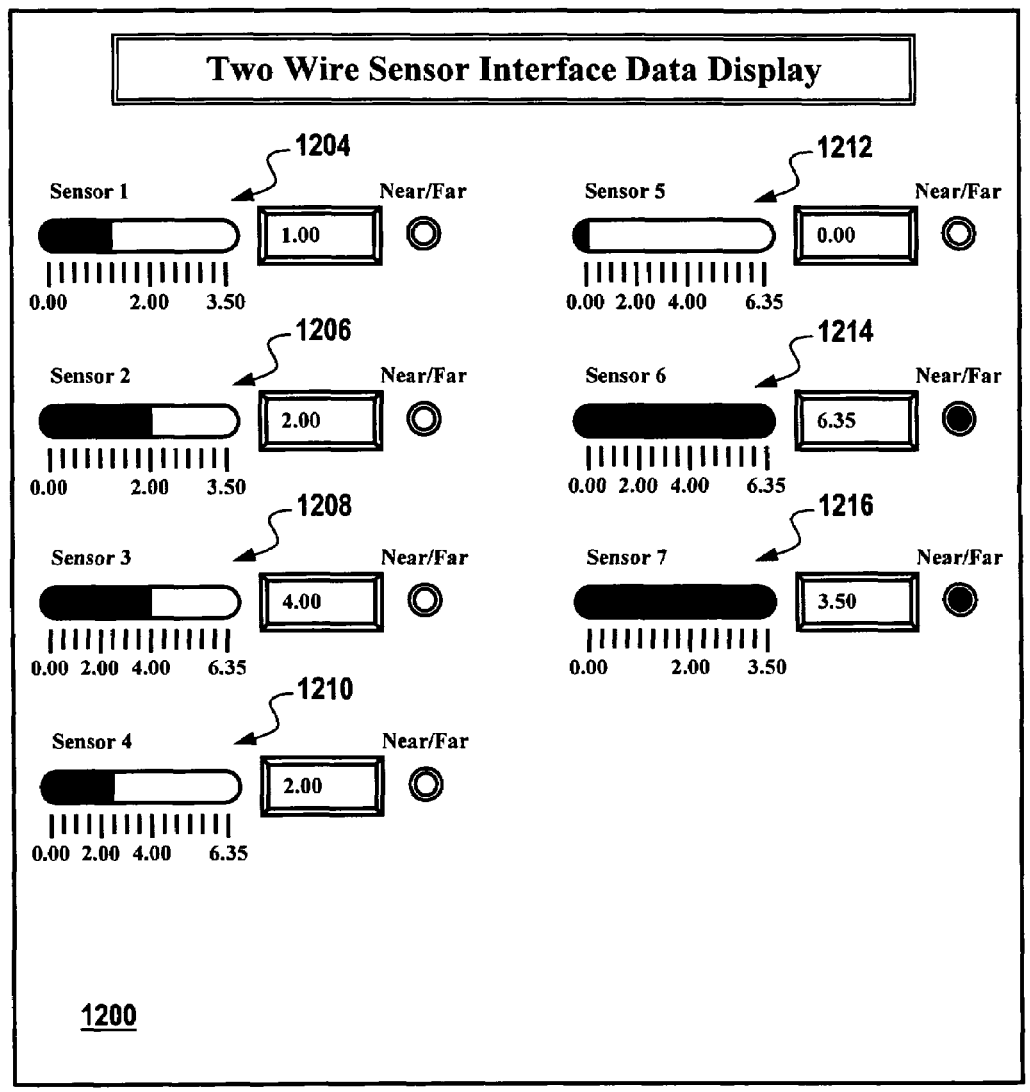
FIG. 12 illustrates a pictorial diagram of a lab view screen, which can be displayed on a graphical user interface of a mobile device, in accordance with an embodiment of the present invention.

FIG. 12 illustrates a pictorial diagram of a lab view screen 1200, which can be displayed on a graphical user interface of a mobile device such as mobile devices 210, 310 and 314, in accordance with an embodiment of the present invention. Lab view screen 1200 provides a plurality of indicators 1204–1216, which are respectively associated with sensors 1–7. The example of FIG. 12 is directed toward two-wire sensor interface display data, which is reflected by indicators 1204–1216.

Utilizing a sensor interface module (SIM) connected to a hand held computing device, it is thus possible to emulate an aircraft system and provide an operator or installer thereof with realtime indications of the sensor-target gap at the time of installation. Due to the high degree of matching between SIM's, the value displayed on the hand held device (e.g., mobile device 210 of FIG. 2 and/or mobile devices 310 and 314 of FIG. 3) is generally equivalent to that present in the aircraft system. The advantage of the approach described herein with respect to preferred and alternative embodiments, is that the need for "feeler" gauges is removed because the sensor can be continuously adjusted and displayed via the mobile device.

Upon completion of the sensor installation, the sensor position, sensor identification data, sensor serial number and installation gap value can be stored in a database for use in fault detection and maintenance. A master database (e.g., database 208 of FIG. 2) can be updated when the hand held device and/or other mobile device is connected to a main computer terminal either directly or through wireless means. Such a master database can then be available for remote access, for example, through a wireless network, a computer network such as the World Wide Web, or a combination thereof. Connection of a similar hand held computing device or mobile device and SIM thereof at a remote location can quickly identify a shift from the original set point of a sensor on the aircraft. Such an approach reduces installation time for the constructor, while reducing maintenance time for the aircraft and providing early warning of sensor failure, thereby reducing the overall cost of ownership of the proximity sensor system at issue.

Figure 13:
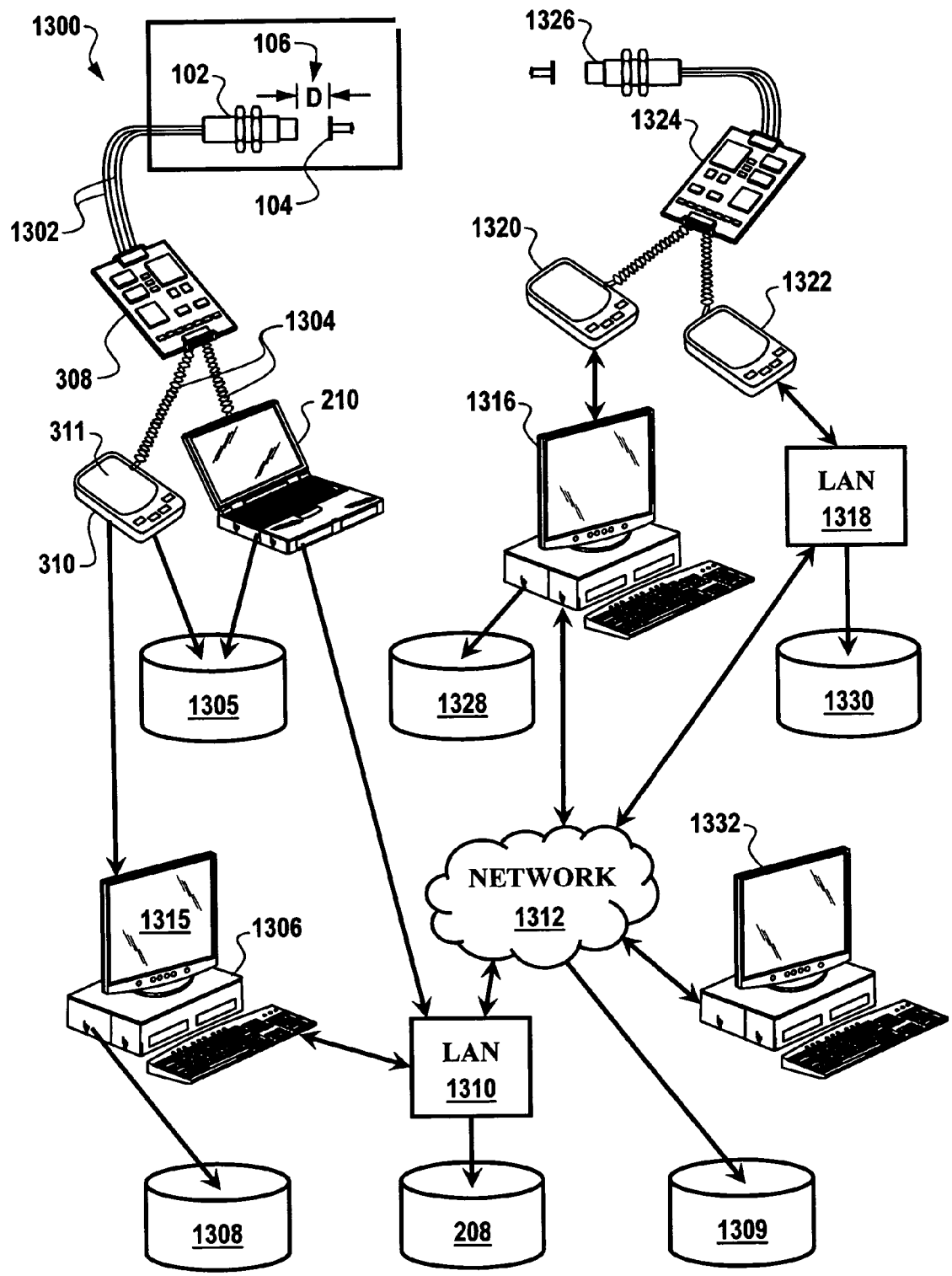
FIG. 13 illustrates a block diagram of a system, which can be implemented in accordance with an alternative embodiment of the present invention.

FIG. 13 illustrates a block diagram of a system 1300, which can be implemented in accordance with an alternative embodiment of the present invention. Note that in FIGS. 1–13, identical or similar parts or elements are indicated by identical reference numerals. For example, system 1300 includes system 100 of FIG. 1, which includes sensor 102 located a distance D (i.e., see gap 106) from target 104. Note that sensor 102 is also analogous to sensor 302 of FIG. 3.

Data transmission between sensor 102 and SIM 308 is indicated generally by lines 1302. Data can be transmitted from SIM 308 to a mobile device 210, which can be implemented as a PDA rigging tool 310 having a screen 311. Lines 1304 generally represent data transmission from SIM 308 mobile device 210. Instructions can also be transmitted from mobile device 210 to SIM 308 via lines 1304. Note that mobile device 210 can be implemented as a laptop computer instead of a PDA, depending upon a desired implementation of system 1300.

Data from mobile device 210 can be transmitted for storage to a database 1305. Data from mobile device 210 can also be transmitted to database 1305. Additionally, data from mobile device 210 can be transmitted to a computer 1306 which processes a GUI for display on a display screen 1315. Computer 1306 in turn can communicate with a local area network (LAN) 1310, which may be configured as a local/closed network. Data from computer 1306 can be transmitted for storage via a database 1308. Similarly, data from computer 1306 can be transmitted through LAN 1310 for storage at a database 208.

Data from LAN 1310 can be transmitted to an open/global network 1312 (e.g., the World Wide Web), which is analogous to network 212 of FIG. 2. A database 1309 can be associated with a global network 1312. Note that global network 1312 can be configured as a number of network types, including, for example, an open network or a close network, depending upon particular network design implementations. It may desirable to insure that data transmitted between mobile devices, computers, databases the like is transmitted via secure closed network, which may be a global network and/or a localized network.

Database 1309 of FIG. 13 can also be analogous to database 208 of FIG. 2. Additional databases, computers and mobile devices (i.e., hand held computing devices) can also be included as part of system 1300 along a similar data transmission pattern. For example, system 1300 can further include a computer 1316, database 1328, a LAN 1318 and an associated database 1330. Computer 1316 can communicate directly with a mobile device 1320, while computer 1332 can communicate with open/global network 1312. Computer 1316 can communicate with a mobile device 1322 via LAN 1318. Finally, mobile devices 1320 and 1322 can communicate with a sensor interface module 1324, which in turn processes sensor data collected from a sensor 1326, which is located a distance D' from a target 1327. Note that sensor 1326 and target 1327 are respectively analogous to sensor 102 and target 104.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A method for installing and monitoring a proximity sensor, said method comprising the steps of:
    detecting a target utilizing a sensor located proximate to said target;
    automatically generating data said from said sensor, wherein said data comprises information indicative of the relative position of said target and said sensor; and
    thereafter transmitting said data from said sensor to a mobile device having a processor for processing said data and a graphical user interface for the display and manipulation of said data by a user of said mobile device in order to accurately position said sensor and target for installation and maintenance thereof.

2. The method of claim 1 further comprising the step of processing said information through said processor associated with said mobile device to generate information associated with a gap present between said target and said sensor for proper installation and mounting of said target and said sensor.

3. The method of claim 1 further comprising the steps of:
    storing said data in a database accessible by said mobile device, in response to processing said data by said processor associated with said mobile device; and
    thereafter retrieving said data from said database for fault detection and maintenance of said target.

4. The method of claim 1 further comprising the step of:
    associating said database with a network through which said mobile device communicates in order to access data stored within said database.

5. The method of claim 4 wherein said network comprises a wireless network.

6. The method of claim 4 wherein said network comprises a computer network.

7. The method of claim 1 further comprising the step of:
    continuously detecting said target utilizing said sensor to thereby automatically generate updated data from said sensor, wherein said updated data comprises information updated indicative of the relative position of said target and said sensor.

8. The method of claim 7 further comprising the step of:
    automatically transmitting said updated data from said sensor to said mobile device for processing by said processor; and
    thereafter storing said updated data within a database associated with said mobile device.

9. The method of claim 1 wherein said target comprises a component of a moving mechanical apparatus.

10. A method for installing and monitoring a proximity sensor in an electro-mechanical system, said method comprising the steps of:
    detecting a target utilizing a sensor located proximate to said target, wherein said target comprises a mechanical component of an electro-mechanical system;
    automatically generating data said from said sensor, wherein said data comprises information indicative of the relative position of said target and said sensor;
    transmitting said data from said sensor to a mobile device having for processing by a processor associated by said mobile device;
    processing said information through said processor associated with said mobile device to generate information associated with a gap present between said target and said sensor for proper installation and mounting of said target and said sensor;

storing said data in a database accessible by said mobile device, in response to processing said data by said processor associated with said mobile device; and displaying said data via a graphical user interface associated with said mobile device in order for a user of said mobile device to accurately position said sensor and target for installation and maintenance thereof within said electro-mechanical system.

11. A system, comprising:

a sensor for detecting a target located proximate to said target, wherein said sensor automatically generates data from said sensor, such that said data comprises information indicative of the relative position of said target and said sensor;

a mobile device which communicates with said sensor, transmits instructions to said sensor, and receives said data from said sensor, wherein said mobile device comprises a processor and a graphical user interface for displaying said data; and a sensor interface module which communicates with said processor of said mobile device and processes said data received by said mobile device from said sensor and instructs said graphical user interface to display said data in a format that permits a user of said mobile device to accurately manipulate said data in order to position said sensor and said target for installation and maintenance thereof.

12. The system of claim 11 wherein said sensor interface module further processes instructs said processor associated with said mobile device to process said data and generate information indicative of a gap present between said target and said sensor for proper installation and mounting of said target and said sensor.

13. The system of claim 11 wherein said sensor interface module stores data in a database accessible by said mobile device, in response to processing said data by said processor associated with said mobile device; and thereafter retrieves said data from said database for fault detection and maintenance of said target.

14. The system of claim 11 further comprising a network to which said database is associated, wherein said mobile device communicates with said network in order to access data stored within said database.

15. The system of claim 14 wherein said network comprises a wireless network.

16. The system of claim 14 wherein said network comprises a computer network.

17. The system of claim 11 wherein said sensor interface module instructs said sensor to continuously generate updated data indicative of the relative position of said target and said sensor.

18. The system of claim 17 wherein said sensor interface module instructs said sensor to automatically transmit said updated data from said sensor to said mobile device for processing by said processor and subsequent storage within a database associated with said mobile device.

19. The system of claim 11 wherein said sensor interface module processes data generated by said sensor indicative of undesirable back-metal effects thereof.

\* \* \* \* \*